United States Patent
Barbier et al.

(10) Patent No.: US 9,754,381 B2
(45) Date of Patent: Sep. 5, 2017

(54) POSTURE DETECTION SYSTEM WITH RETROREFLECTOR COMPRISING A WIRE-MESHING

(71) Applicant: THALES, Courbevoie (FR)

(72) Inventors: Bruno Barbier, Bordeaux (FR); Laurent Potin, Coutras (FR); Siegfried Rouzes, Le Haillan (FR)

(73) Assignee: Thales, Courbevoie (FR)

( * ) Notice: Subject to any disclaimer, the term of this patent is extended or adjusted under 35 U.S.C. 154(b) by 86 days.

(21) Appl. No.: 14/833,764

(22) Filed: Aug. 24, 2015

(65) Prior Publication Data

US 2016/0063730 A1    Mar. 3, 2016

(30) Foreign Application Priority Data

Aug. 29, 2014   (FR) ..................... 14 01928

(51) Int. Cl.
  *G06T 17/20*     (2006.01)
  *G06T 7/20*      (2017.01)
  (Continued)

(52) U.S. Cl.
  CPC ............ *G06T 7/2006* (2013.01); *G01S 17/46* (2013.01); *G02B 5/124* (2013.01); *G02B 5/126* (2013.01);
  (Continued)

(58) Field of Classification Search
  CPC ....... G06T 7/2006; G06T 7/215; G06T 17/20; G06T 2207/10016; G01S 17/46;
  (Continued)

(56) References Cited

U.S. PATENT DOCUMENTS

| 5,274,379 A | 12/1993 | Carbonneau et al. |
| 7,800,758 B1 | 9/2010 | Bridges et al. |

(Continued)

OTHER PUBLICATIONS

French Search Report for French Counterpart Application No. FR 1401928, 7 pgs. (May 4, 2015).

(Continued)

*Primary Examiner* — Amandeep Saini
(74) *Attorney, Agent, or Firm* — Blakely, Sokoloff, Taylor & Zafman LLP

(57) ABSTRACT

The general field of the invention is that of systems for detecting the posture of a moving object. The system may include a fixed electro-optical device of known orientation comprising an emission source, an image sensor and image analysis means, and an optical assembly comprising an optical retroreflector arranged on the moving object. The optical retroreflector of the system is an optical sphere of variable index comprising a transparent hemisphere and a reflecting hemisphere. It comprises a meshing comprising at least three opaque wires, of small thickness and known geometrical arrangement. The image of the retroreflector lit by the source forms a reflection on the image sensor, said reflection comprising at least the two images of the shadow of one of the three wires. The image analysis means detect the orientation of the leak line given by said images, said orientation being representative of one of the parameters of the posture of the moving object.

7 Claims, 19 Drawing Sheets

(51) Int. Cl.
| | |
|---|---|
| *G02B 5/126* | (2006.01) |
| *G06F 3/03* | (2006.01) |
| *G06K 9/32* | (2006.01) |
| *G02B 5/124* | (2006.01) |
| *G02B 27/32* | (2006.01) |
| *G01S 17/46* | (2006.01) |
| *G06T 7/215* | (2017.01) |
| *G01S 5/16* | (2006.01) |

(52) U.S. Cl.
CPC ........... *G02B 27/32* (2013.01); *G06F 3/0325* (2013.01); *G06K 9/3241* (2013.01); *G06T 7/215* (2017.01); *G06T 17/20* (2013.01); *G01S 5/163* (2013.01); *G06T 2207/10016* (2013.01)

(58) Field of Classification Search
CPC ......... G01S 5/163; G02B 5/126; G02B 5/124; G02B 27/32; G06F 3/0325; G06K 9/3241
USPC ........................................................ 382/103
See application file for complete search history.

(56) References Cited

U.S. PATENT DOCUMENTS

| | | |
|---|---|---|
| 2006/0109561 A1 | 5/2006 | Handerek et al. |
| 2010/0245806 A1* | 9/2010 | Lundvall .............. G01B 11/272 356/138 |
| 2012/0206808 A1 | 8/2012 | Brown et al. |
| 2014/0016138 A1 | 1/2014 | Barbier et al. |

OTHER PUBLICATIONS

John P. Oakley, "Whole-angle spherical retroreflector using concentric layers of homogeneous optical media," Appl. Optic, vol. 46, No. 7, pp. 1026-1031 (Mar. 1, 2007).
NC Anheier, et al., "FY 2008 Miniature Spherical Retroreflectors—Final Report," Pacific North West National Laboratory, Document No. PNNL-16344, 32 pgs. (Feb. 2009).
European Patent Office Communication enclosing Extended European Search Report for corresponding European Patent Application No. 15181931.5, 5 pp., (Dec. 23, 2015).

* cited by examiner

POSTURE DETECTION SYSTEM WITH RETROREFLECTOR COMPRISING A WIRE-MESHING

BACKGROUND OF THE INVENTION

1. Field of the Invention

The field of the invention is that of the optical devices used to measure the orientation of an object in space without contact. There are various possible fields of application, but the main application is the detection of aircraft pilot headset posture, thus making it possible to project into his or her visor an image exactly superposed on the outside landscape or to slave various systems of the apparatus to his or her gaze. The posture of an object should be understood to be its orientation and its position relative to a known frame of reference.

2. Description of the Prior Art

There are various optical techniques that can be used to measure orientation on a headset. Generally, noteworthy elements are installed on the headset which are identified by an optical emission and reception system. The position of the images of these noteworthy elements makes it possible to determine, by computation, the position and the orientation of the headset.

To this end it is possible to use retroreflecting cube-corners or retroreflectors. All that is required is to arrange the optical emission and reception members on a same axis. These retroreflector systems are, by nature largely insensitive to solar lighting.

By way of exemplary embodiment, they can be combined with a fixed opto-electronic device comprising a spot source associated with an assembly comprising one or two matrix sensors without optical lens. In this arrangement, the reflector is equipped with a mask applied onto its input face. This mask comprises a transparent central part and an opaque peripheral part. The contour of the mask is in the form of a polygon, thus embodying at least the orientation of two fixed directions of the headset. The orientation of the headset is computed by the analysis of the forms of the contour projected onto the sensor or sensors. The analysis focuses on the transitions between the light and dark areas of the reflection received by the sensor.

To determine the orientation and the position of the reflector, the only things used are either the projections of the sides of the contour of the polygonal mask, or, in the absence of mask, the projections of the sides of the polygonal contour of the reflector.

Each side of the contour provides, by central projection onto a plane, two concurrent directions and therefore a leak point.

At the periphery of the angular field, only two sides of the contour are effectively projected. They are two consecutive sides of the contour, and they provide, on the plane, four concurrent directions in pairs, i.e. two leak points.

In the central part of the angular field, at least three sides of the contour are effectively projected. They provide, on the plane, at least six concurrent directions in pairs, i.e. three leak points.

FIGS. 1 to 8 illustrate this phenomenon of the number of leak points in the simplified case of a reflector with equilateral triangular contour;

FIG. 1 represents the general principle of the projection onto a plane P1 of a point M1 of the contour of the mask of the reflector Re of vertex O, from the radiation of the spot source S, close to P1. The point T is the intersection of the input face of the reflector and of the straight line SO. On P1, the projection of T common with that of O is the point T.

FIG. 2 represents the input face of a cube-corner reflector without mask, with equilateral triangular input face PQR.

FIGS. 3 and 4 represent, for a spot lighting source at infinity, that is to say a source S far from the reflector, the reflection represented by shading obtained by projection onto an image sensor close to the source S, in the particular case where this projection plane is parallel to the input face of the reflector. Two configurations arise. The first configuration is represented in FIG. 3. The incident radiation is close to the edge of the angular field of the reflector. The contour is a parallelogram. The second configuration is represented in FIG. 4. The incident radiation is then close to the centre of the angular field. The contour is a hexagon with sides that are parallel in pairs. These contours are both centred on the projection T' of T, the centre of symmetry between the projected symmetrical triangles P'-Q'-R' and P'0-Q'0-R'0.

When the projection plane is not parallel to the plane of the input face PQR, the reflections are distorted, but, for each of the reflection contours, their sides remain parallel in pairs. The vertices and the sides of each reflection are symmetrical relative to the point T', the projection of the point T.

When the source S is at a finite distance, the sides of the contour of the polygonal reflections are no longer parallel to one another, the reflection no longer has a centre of symmetry but T' remains the point of conjunction of the diagonals from the opposite vertices of the contour of the reflection and the intersections of the opposite sides provide, respectively, on the projection plane which corresponds to the plane of the sensor, two leak points at the edge of the angular field as can be seen in FIG. 5 and three leak points in the central angular field as can be seen in FIG. 6.

The reduction of the number of leak points from three to two by moving from the central field to the field edge is, of course, as indicated above, also valid in the case of a reflector with polygonal contour or with polygonal mask contour which may be planar or not.

Consequently, whatever the polygonal contour, other than the mask in parallelogram form, to determine the six orientation/position unknowns, only four parameters corresponding to the coordinates of two leak points are measured at the field edge. Thus, at the field edge, the orientation/position measurement is difficult to perform, without the help either of a fixed ancillary device in proximity to the source such as, for example, a blanking screen or a resist in a return mirror, or of a second sensor. Such is the first drawback of mask posture detection systems according to the prior art.

Also, a cube-corner reflector exhibits an ambiguity of orientation, with nothing to a priori distinguish the different sides of the mask. A form coding produced by means of markings in the form of nicks or bosses is therefore applied onto the contour of the reflector or of its mask in proximity to the vertices. In this way, the projection of this coding makes it possible to unequivocally associate each of the vertices of the projected figure with one of the vertices of the contour of the reflector or of its mask. The production of the different marks and their identification constitutes the second drawback of the mask posture detection systems according to the prior art.

Finally, the angular field of a cube-corner reflector is limited to a solid angle of $\pi/2$ sr. This field is insufficient to cover, for example, the head rotations of a user. It is therefore essential to be able to use several cube-corners of different orientation to cover a greater field. Such is the third drawback of the mask posture detection systems according to the prior art.

SUMMARY OF THE INVENTION

The system for detecting the posture of a moving object according to the invention does not exhibit these drawbacks. The retroreflector comprises a wire-meshing or a "cage" generating, within the projected reflection, filiform shadows which participate in the measurement. These shadows, made up of dark lines on the light background of the reflection, are easily identified, even in the presence of a dark surface such as that generated by a fixed screen or by the resist of a mirror.

More specifically, the subject of the invention is a system for detecting the posture of a moving object in space comprising:
  a fixed electro-optical device of known orientation comprising at least one emission source, an image sensor and image analysis means, and
  an optical assembly comprising at least one optical retroreflector arranged on the moving object,
characterized in that:
  the optical retroreflector is an optical sphere of variable index comprising a transparent hemisphere and a reflecting hemisphere such that a light ray, refracted by the transparent hemisphere, reflected by the reflecting hemisphere and refracted a second time by the transparent hemisphere re-emerges parallel to its direction of incidence;
  the optical retroreflector comprises a meshing comprising at least three opaque wires, of small thickness and known geometrical arrangement;
  the image of the retroreflector lit by the source forms a reflection on the image sensor, said reflection comprising at least the two images of the shadow of one of the three wires by the retroreflector;
  the image analysis means detect the orientation of the leak line given by said images, said orientation being representative of a first parameter of the posture of the moving object.

Advantageously, the analysis means detect the form of the reflection, said form being representative of at least one second parameter of the posture of the moving object.

Advantageously, the wire meshing comprises eight straight wires of equal length, four first wires forming a square and four second wires being parallel to one another, at right angles to the plane of the square, one of the ends of the four second wires being merged with one of the ends of the four first wires.

Advantageously, the wire-meshing comprises four semi-circular wires of identical form, two first wires being arranged in two first planes symmetrically parallel relative to the centre of the sphere, two second wires being arranged in two second planes symmetrically parallel relative to the centre of the sphere, the two second planes being at right angles to the two first planes.

Advantageously, the meshing comprises third semi-circular wires of identical form obliquely intersecting the first wires and/or the second wires.

Advantageously, the contour of the reflection is an inclined ellipse, the inclination of the ellipse, the lengths of the great and small axes being representative of parameters of the posture of the moving object.

The invention applies to the detection of posture of a pilot headset. The headset then comprises an optical retroreflector as described above.

BRIEF DESCRIPTION OF THE DRAWINGS

The invention will be better understood and other advantages will become apparent on reading the following description given as a nonlimiting example and using the attached figures in which:
FIGS. 3 to 12 represent the different reflections obtained on the image sensor with the retroreflector of FIG. 7.

DETAILED DESCRIPTION

The system for detecting the posture of a moving object in space according to the invention comprises, basically:
  a fixed electro-optical device of known orientation comprising at least one first spot emission source, a planar image matrix sensor and electronic image analysis means, and
  an optical assembly comprising at least one optical retroreflector arranged on the moving object, the optical retroreflector comprises a meshing comprising at least three opaque wires, of small thickness and known geometrical arrangement;
  the image of the retroreflector lit by the source forms a reflection on the image sensor, said reflection comprising at least the two images of the shadow of one of the three wires by the retroreflector;
  the image analysis means detect the orientation of the leak line given by said images, said orientation being representative of one of the parameters of the posture of the moving object.

There are different types of retroreflectors. The one most commonly used is the cube corner. It is also possible to use a reflecting sphere of particular optical index. There are also different geometric configurations of the meshing. By way of nonlimiting examples, four exemplary embodiments of the retroreflector and of its wire-meshing are described below. In the different figures associated with the different embodiments, the following conventions have been adopted:
- the elements of the meshing or their reflections are represented by bold lines;
- the reflections obtained on the image sensor are represented by dotted-line patterns.

First Embodiment: Cute-Corner Reflector with Three-Rod Cage

Figure 1:
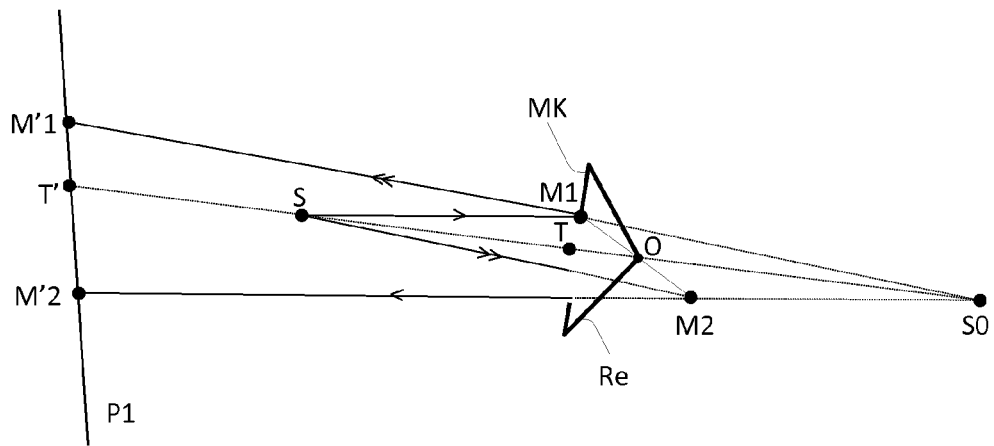
FIGS. 1 to 6, already discussed, represent the operation of a posture detection system with retroreflector according to the prior art.
Figure 2:
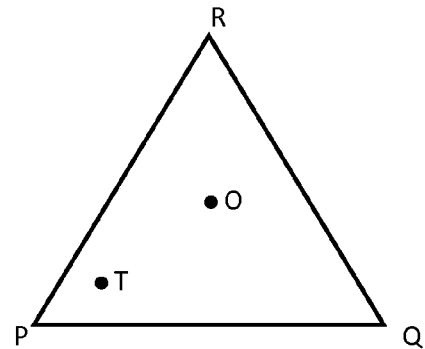
Figure 3:
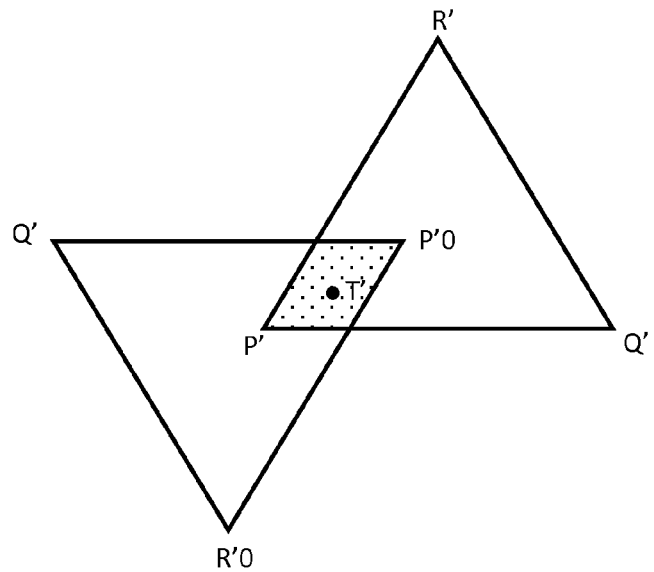
Figure 4:
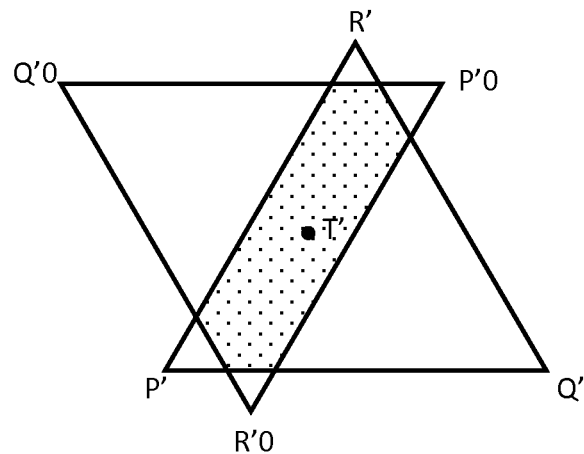
Figure 5:
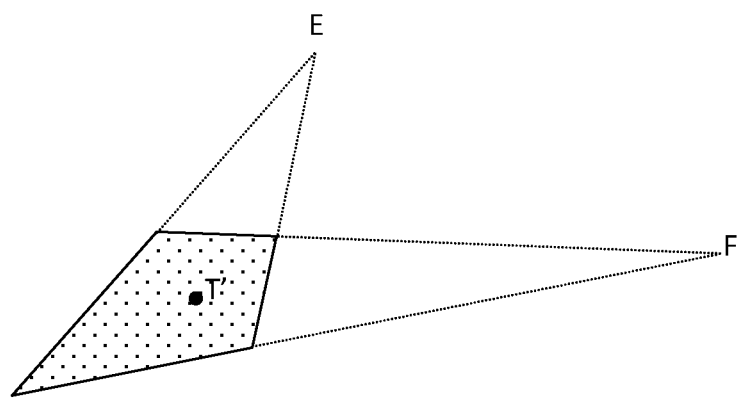
Figure 6:
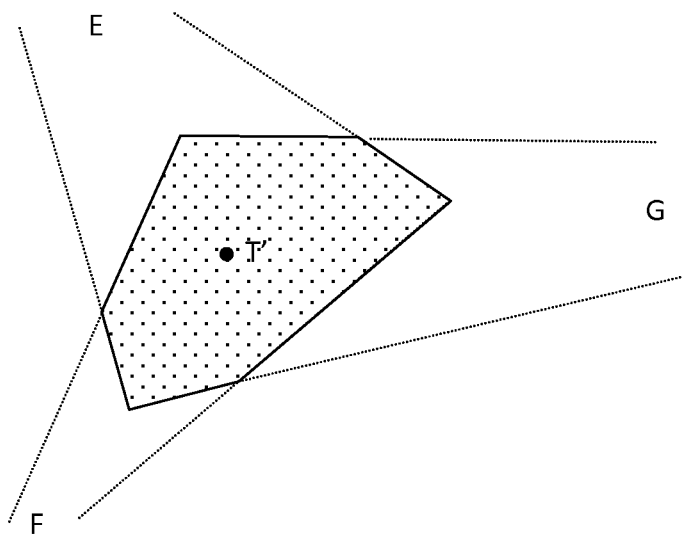
Figure 7:
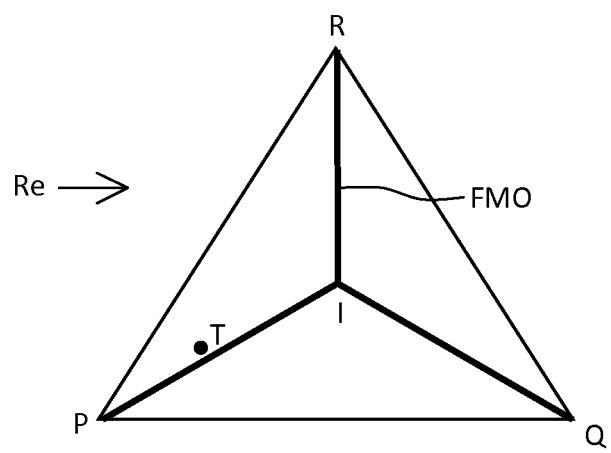
FIG. 7 represents a first embodiment of a cube-corner retroreflector.

In this first exemplary embodiment, the retroreflector Re is a cube corner. It comprises three reflecting planar faces that are at right angles in pairs and a transparent planar input face of triangular form. As can be seen in FIG. 7, the triangular input face denoted PQR comprises three coplanar straight rods FMO arranged in a star linking the centre I of the front face to each vertex of the triangular contour.

Figure 8:
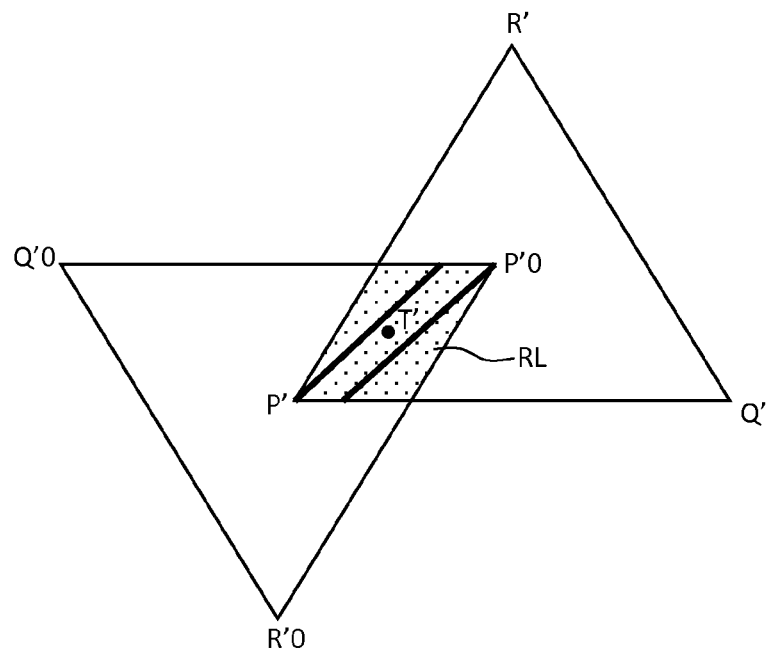

When the retroreflector is lit by a spot source S at the edge of the angular field of the reflector at infinite distance and when the orientation of the input face PQR of the retroreflector is parallel to the plane of the sensor, the following is obtained, as represented in FIG. 8:
- a light reflection RL whose contour is a parallelogram, the intersection of the images P'Q'R' and P0'Q0'R0' of the input face PQR of the cube corner;
- this reflection is passed through by two shadows of rods, rectilinear and parallel and easy to discriminate from the light background;
- these two straight lines are derived from two opposite vertices of the parallelogram and are symmetrical relative to point T', the projection of the point T and centre of the light parallelogram. As previously, the point T is the intersection of the input face of the reflector and of the straight line SO.

Figure 9:
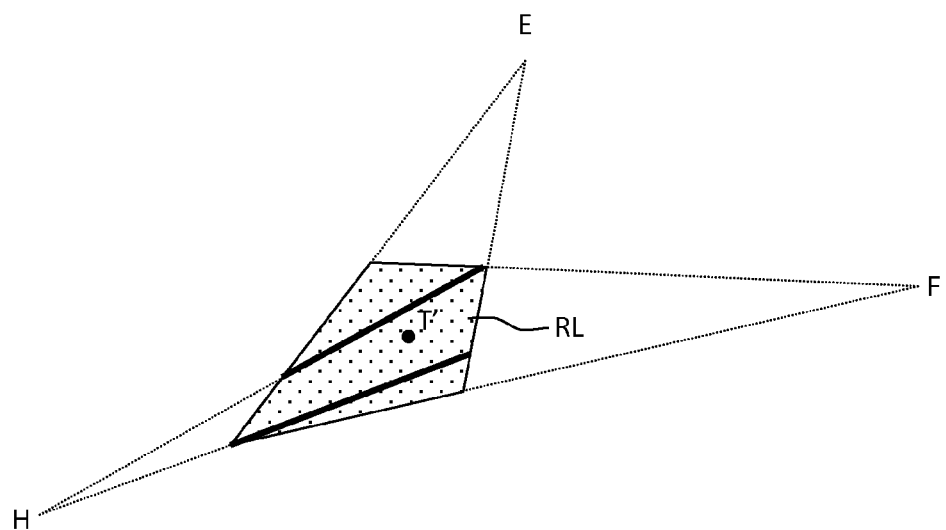

In the general case where the source S is at the angular field edge of the reflector and at a finite distance and where the orientation of the reflector is any relative to the plane of the sensor, the following is obtained as indicated in FIG. 9:
- a light reflection RL whose contour is a quadrilateral with non-parallel sides;
- this reflection is passed through by two non-parallel rectilinear shadows which can be easily discriminated from the light background;
- these two black straight lines are derived from two opposite vertices of the quadrilateral;
- three leak points are thus determined, which are the points E and F, intersections of the straight lines bearing the sides of the reflection and the point H, intersection of the two black straight lines.

The position of the centre of projection S0 is given by the common intersection of three surfaces of revolution SR1, SR2 and SR3 of respective axes EF, EH and FH. These three surfaces are defined as follows.

The surface SR1 corresponds to all the points of the space from which the segment EF is seen from a constant angle A. This angle A is the angle between the two directions for which E and F are the leak points by projection, that is to say the angle between the sides PR and PQ of the contour of the reflector, A is therefore 60 degrees. If follows therefrom that:
- SR1 is a torus, the angle A being less than 90 degrees;
- of axis EF;
- centred at the middle of EF;
- of major radius d=EF/(2tg60°);
- of minor radius r=EF/(2 sin 60°);
- SR1 is a closed torus, that is to say in the form of a pumpkin, because r is greater than d.

The surface SR2, similarly, is centred on the middle of EH, it is constructed from the angle between the straight lines PR and PI, i.e. 30°.

The surface SR3, similarly, is centred on the middle of FH, it is constructed from the angle between the straight lines PQ and PI, i.e. 30°.

The position of the vertex O of the reflector is that of the middle of the segment S-S0. The orientation of the reflector is given by those of any two out of the three straight lines PR, PQ, PI whose orientations are respectively those of the straight line segments S0-E, S0-F and S0-I.

Furthermore, the accuracy on the location of the centre of projection S0 is enhanced by an additional property: the centre S0 belongs also to the straight line ST', linking the source S to the point T' the intersection of the diagonals of the projected quadrilateral.

The presence of the black rods also makes it possible to improve the locating of the point T', since this point T' belongs also to the segment joining together the ends of the black straight lines on the sides of the contour.

Figure 10:
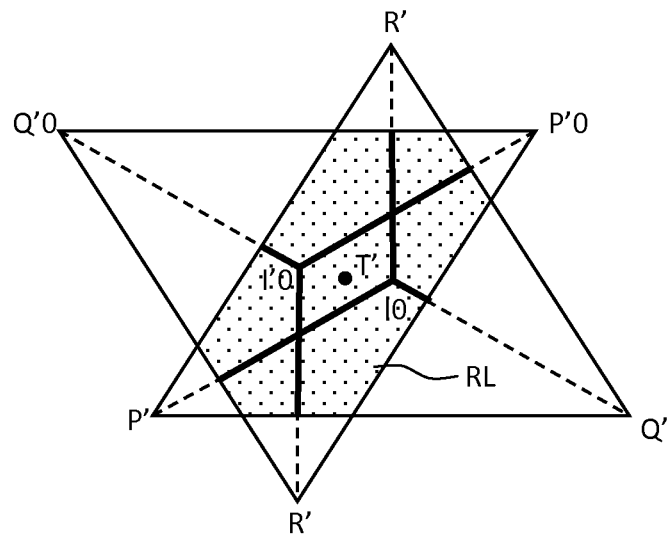

For a source at infinite distance, in the central angular field of the reflector, and an orientation of the input face PQR of the reflector parallel to the plane of the sensor, the following is obtained, as indicated in FIG. 10,
- a light reflection RL whose contour is a hexagon with mutually parallel sides in pairs;
- this reflection is passed through by six rectilinear shadows that can easily be discriminated from the light background;
- these six black straight lines are each secant to a side of the hexagon;
- these six black straight lines are distributed in two groups of three straight lines "with common termination" at two points I' and I'0; these two points I' and I' are the projections of the centre I of the input face of the reflector and of its symmetrical element relative to the vertex O of the reflector;
- the three black straight lines of a group are individually parallel to the three black straight lines of the other group.
- the point T', the centre of the hexagon, is the centre of symmetry of FIG. 10.

Figure 11:
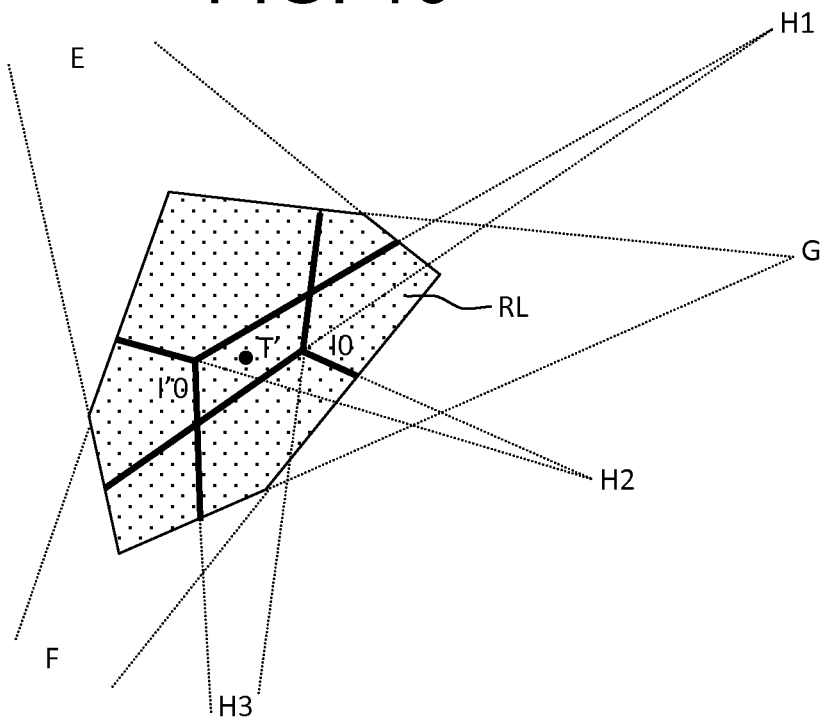

In the general case where the source S is at a finite distance, in the central angular field of the reflector and the orientation of the reflector can be any relative to the plane of the sensor, the following is obtained, as indicated in FIG. 11,
- a light reflection RL whose contour is any hexagon;
- this reflection is passed through by six rectilinear shadows that can be easily discriminated from the light background;
- these six black straight lines are each secant to a side of the hexagon;
- these six black straight lines are distributed in two groups of three straight lines "with common termination" I' and I' which are respectively the projections of the centre I of the input face of the reflector and of its symmetrical element relative to the vertex O of the reflector;

the three leak points supplied by the black straight lines are the intersections of two straight fines belonging to two different groups and secant to two opposite sides of the hexagon;

the point T' is the common intersection between
the three diagonals from opposite vertices of the hexagon,
the segment I'-I'0,
the three segments joining the ends on the sides of the contour of each of the six black straight lines in pairs.

Thus, the point T' and six teak points, which are the points E, F and G between the straight lines bearing the opposite sides of the hexagonal contour of the reflection, and H1, H2 and H3 between the black straight lines of the two groups, are obtained. They make it possible to locate S0 on the common intersection;

with six surfaces of revolution constructed from the six pairs of points (EF, FG, EG, H1H2, H2H3, H1H3) respectively associated with the three directions of the sides of the triangle PQR and with the three directions of the rods IP, IQ and IR, bisecting the triangle,
with the straight line ST'.

The orientation of the reflector is given by any two of the six straight lines linking S0 to each of the six leak points.

A variant may consist, for example, in arranging the rods from each vertex, in a manner noncoplanar with the front face of the reflector. The case of a retroreflector with hexagonal contour, planar or not, or with mask with hexagonal contour can be treated similarly by equipping each of the six vertices with a rod.

The case of the reflector with mask in parallelogram form can be treated similarly by replacing the three rods from the vertices of the triangular contour of the reflector by two rods from each vertex of the mask in parallelogram form.

Figure 12:
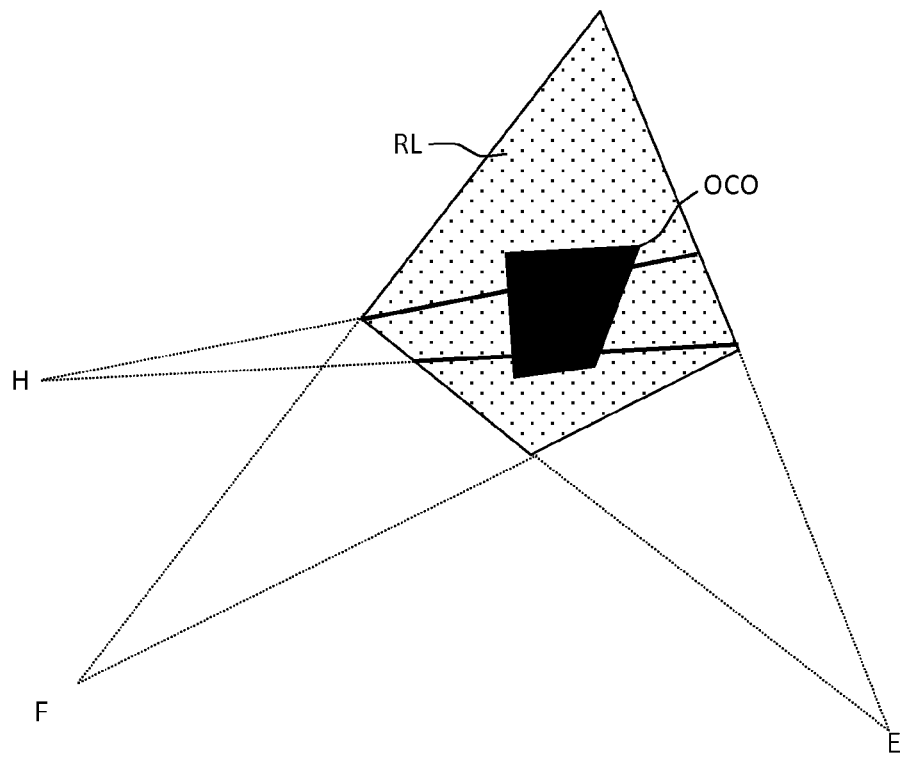

The meshing based on blanking rods in front of the reflector can operate with a blanking screen arranged in front of the source S or a resist in a return mirror, also arranged at the level of the source S. As an example, FIG. 12 gives the appearance of the reflection RL obtained with a rectangular overlay arranged in the vicinity of the source and a mask in parallelogram form equipped with two blanking rods on its diagonals. The two black straight lines obtained are the shadows of just one of these two rods, the two shadows of the second rod not appearing. There are obtained in total:

the two leak points E and F of the contour of the reflection due to the mask;
the leak point H of the two shadows of one of the rods;
the two leak points not represented of the sides of the black central shadow OCO of the fixed rectangular blanking screen.

Generally, with the device with additional fixed blanking screen, in a same light reflection, two different sods of shadows are thus exploited which, although not separate, are easy to distinguish from one another by their specific forms:
one-dimensional transverse shadows,
a two-dimensional central shadow with polygonal contour.

Second Exemplary Embodiment; Cube Corner Reflector with Six-Rod Cage

In this second exemplary embodiment, the same cube corner retroreflector Re is used as previously. Added to the Input face PQR of the reflector with triangular input face, are six coplanar rectilinear rods FMO, derived from each vertex and "with common termination" in pairs inside the triangular front face. Each pair of rods thus forms, with one of the sides of the planar triangular input face, a triangle, the three triangles formed by the three pairs of wires being all different. The orientation of the six rods is such that the cross-ratio of the beam of four concurrent straight lines on each vertex of PQR is different from one vertex to another.

Figure 13:
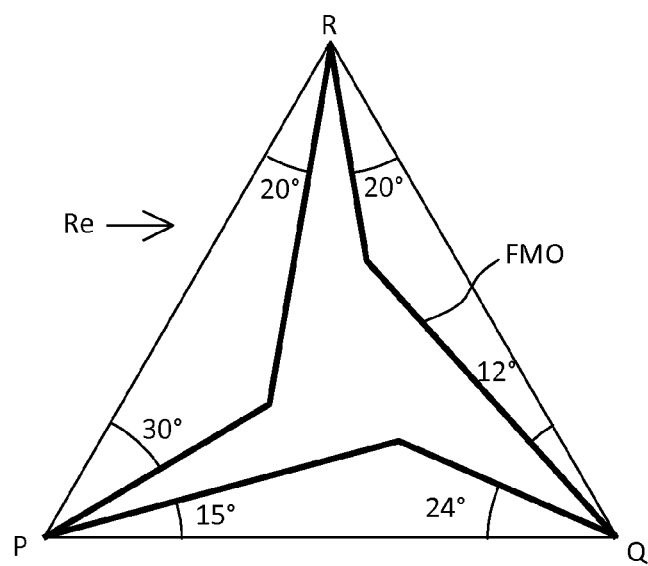
FIG. 13 represents a second embodiment of a cube-corner retroreflector.

FIG. 13 represents this geometrical arrangement. In the case of FIG. 13, the cross-ratio defined from the sine of the angles between the four straight lines of the beam has the value, for example, at P:

$$r=[\sin(15°+15°)/\sin 15°]/[\sin(15+15°+30°)/\sin(15°+30°)]$$

$$r=1.577$$

Figure 14:
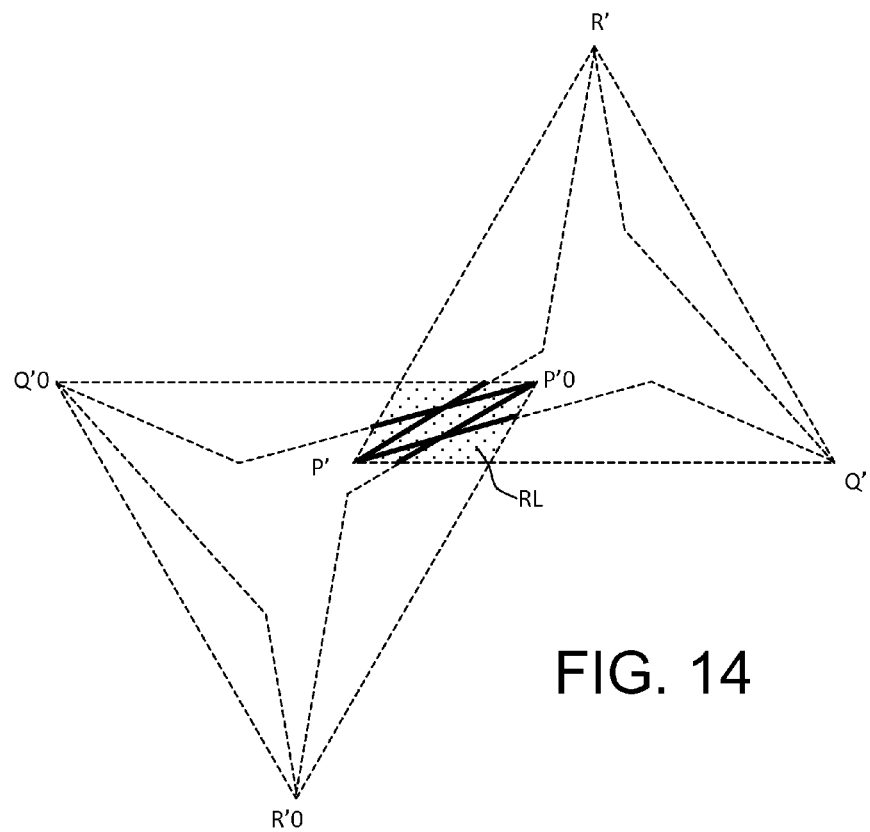
FIGS. 14 to 17 represent the different reflections obtained on the image sensor with the retroreflector of FIG. 13.

For a source S at infinite distance whose direction is close to the angular field edge of the reflector and for a retroreflector whose input face is parallel to the plane of the sensor, there are obtained, as indicated in FIG. 14:

a light reflection RL whose contour is a parallelogram,
this reflection is passed through by four rectilinear shadows,
parallel in pairs and easy to discriminate from the light background,
concurrent on two opposite vertices of the light contour in parallelogram form.

The common value of the cross-ratio of each of the beams of four concurrent directions gives the one, out of the three vertices P, Q or R, for which the images are these two vertices.

Figure 15:
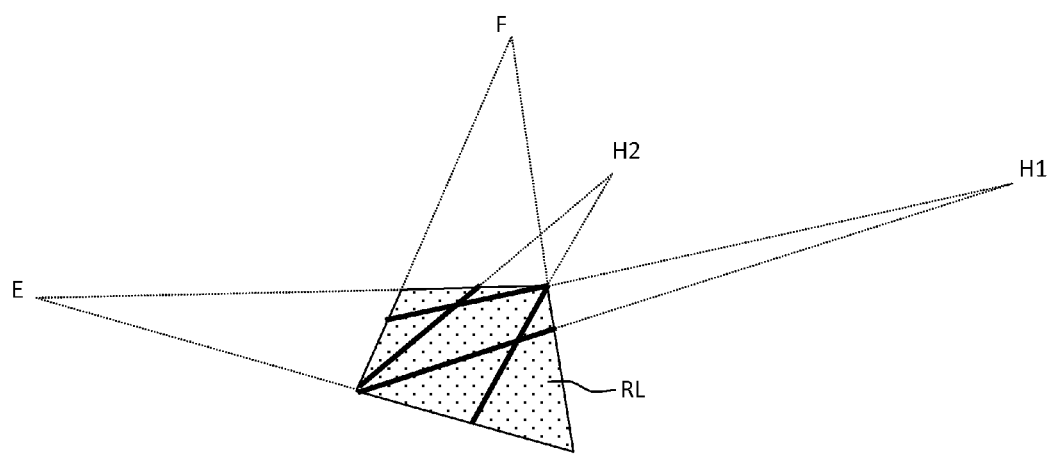

In the general case where the source is at a finite distance whose direction is close to the angular field edge and for which the orientation of the reflector is any relative to the plane of the sensor, there are obtained, as indicated in FIG. 15:

a light reflection RL whose contour is a quadrilateral with non-parallel sides,
this reflection is passed through by four non-parallel rectilinear shadows that can easily be discriminated from the light background,
these four black straight lines are concurrent in pairs on two opposite vertices of the quadrilateral.

The common value of the cross-ratio of each of the two beams consisting of four concurrent directions, two black straight lines and two sides of the light quadrilateral gives that of the three vertices P, Q or R for which the projected images are these two opposite vertices of the quadrilateral.

Thus, four leak points are collected which are, respectively, the points E, F, intersections of the straight lines bearing the sides of the reflection, and the points H1 and H2, intersections of the four black straight lines in pairs.

Figure 16:
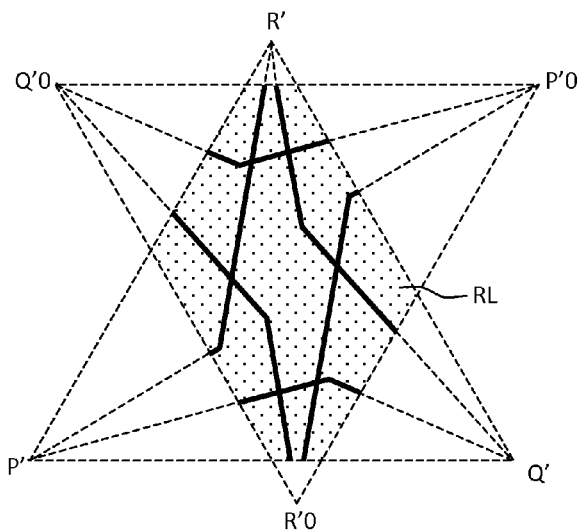

For a source at infinite distance whose direction is close to the centre of the angular field of the reflector and for which the orientation of the input face PQR of the reflector is parallel to the plane of the sensor, there are obtained, as indicated in FIG. 16;

a light reflection RL whose contour is a hexagonal with mutually parallel sides in pairs;
this reflection is passed through by twelve rectilinear shadows that can easily be discriminated from the light background;
these twelve black straight lines are each secant to a side of the light hexagon;
these twelve black straight lines are distributed in two groups of six straight lines with "common termination" in pairs according to six points internal to the hexagonal reflection;
the six black straight lines of a group are individually parallel to the six black straight lines of the other group, the extensions of the two black straight lines which intersect a same side of the hexagon and the two extensions of the two neighbouring sides are concurrent at a same point outside the hexagon. They form, at this point, a beam of four straight lines for which the value of the cross-ratio makes it possible to identify, out of the three vertices P, Q or R, the one for which this vertex is the image by projection.

Figure 17:
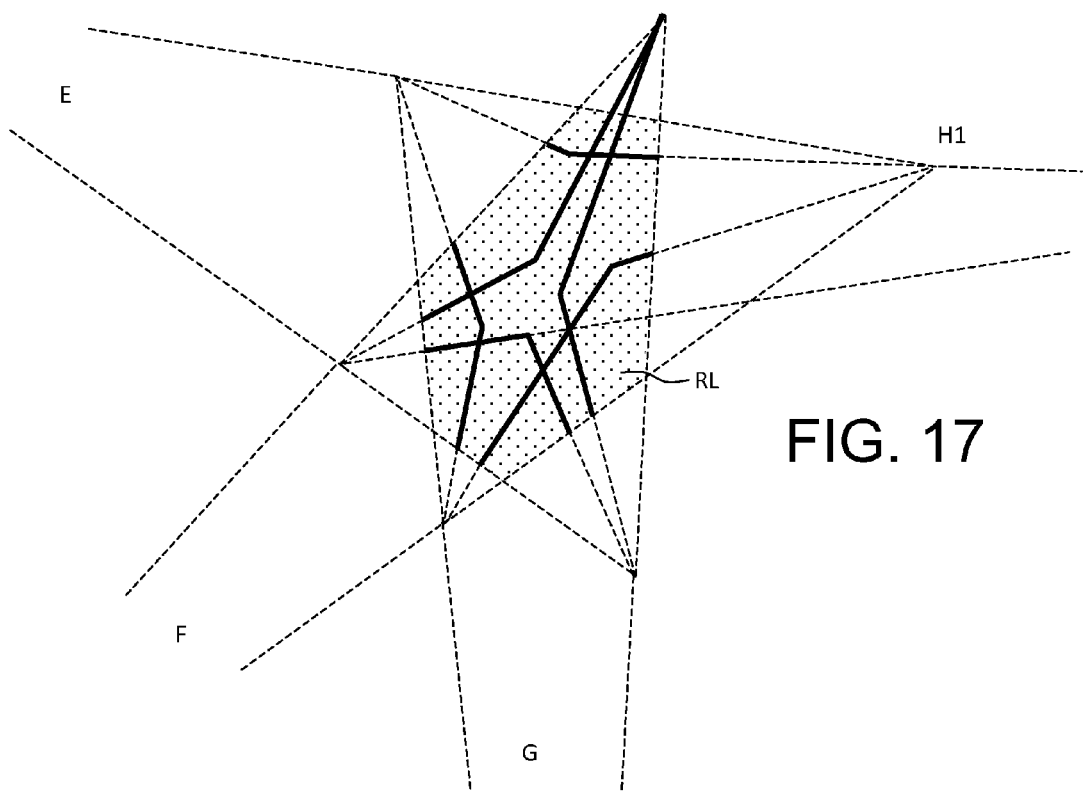

In the general case where the source is at finite distance and/or where the orientation of the reflector is any relative to the plane of the sensor, there are obtained, as represented in FIG. 17:

a light reflection RL whose contour is any hexagon, this reflection is passed through by twelve rectilinear shadows that can be easily discriminated from the light background, these twelve black straight lines are each secant to a side of the hexagon, these twelve black straight lines are distributed in two groups of six straight lines with "common termination" in pairs according to six points inside the hexagonal reflection, the extensions of the two black straight lines which intersect a same side of the hexagon and the extensions of the two sides neighbouring this side, are concurrent at a same point. They form, at this point, a beam of four straight lines for which the value of the cross-ratio makes it possible to identify, from the three vertices P, Q or R, the one for which this vertex is the image, the six leak points supplied by the six pairs of black straight lines consisting of straight lines which
belong to two different groups,
are secant to two opposite sides of the hexagon,
are secant on the opposite ends of these two opposite sides.

In all, nine leak points are collected:

the three points E, F and G, points of conjunction between the straight lines bearing the opposite sides of the hexagonal contour of the reflection, the six points H1 to H6, only H1 is identified in FIG. 17, points of conjunction between the six pairs of black straight lines.

Third Exemplary Embodiment: Spherical Reflector in Rectilinear Cage

Figure 18:
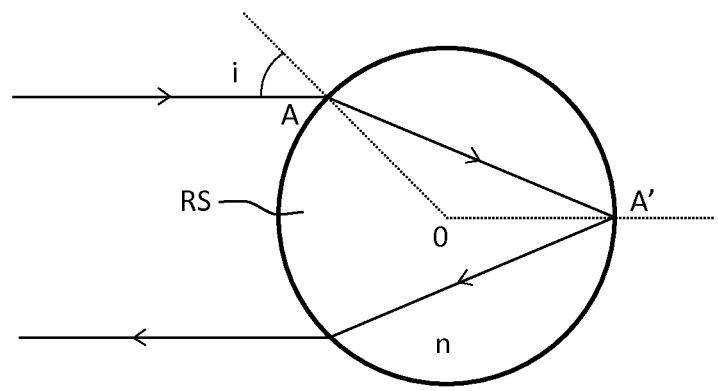
FIG. 18 represents a spherical retroreflector implemented by the system according to the invention.

It is possible to replace the cube corner reflector of the preceding embodiments with a spherical reflector RS. In effect, as can be seen in FIG. 18, for a transparent sphere of centre O, placed in the air, an incident ray at A, reflected at A' emerges from the sphere at A" in the direction symmetrical to the incident ray relative to the centre O, if:

for a small angle of incidence i, the index n of the sphere is 2, when the incidence increases, the index n decreases according to a specific law to $2^{0.5}$.

To approach these conditions, a number of techniques are possible. The production of spheres with index gradient or spheres with index jumps represented in cross section in FIG. 19 will be cited. These productions are reported by a number of authors. Additional information on such productions will be found in the following documents: Oakley J P. 2007. "Whole-angle spherical retro reflector using concentric layers of homogenous optical media", Appl. Optic Vol. 46, No. 7 p. 1028-1031—Anheier N C et al., February 2009 "FY 2008 Miniature Spherical Retro-reflectors—Final Report", Pacific North West National Laboratory—18344 and Handerek, Laycock, "Retroreflective device comprising gradient index lenses", US patent, US 2008/0109561.

Figure 19:
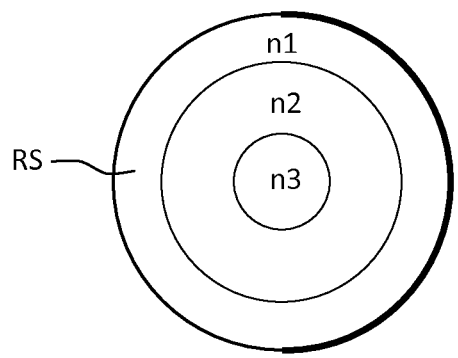
FIG. 19 represents an embodiment of a spherical retroreflector implemented by the system according to the invention.

If, in addition, the orientation of the incident radiation is limited so as to use only a single hemisphere in reflection, the latter can then receive a reflecting treatment represented in bold in FIG. 19 to maximize the reflected intensity. The orientation of the incident radiation relative to the normal to the plane of separation of the two hemispheres is then less than 90°, i.e. a solid angle of $2\pi$ sr around this normal to the plane.

It is possible to compute the position of a reflection given by a spot source S by retroreflection on a retroreflecting sphere such as has just been defined.

Figure 20:
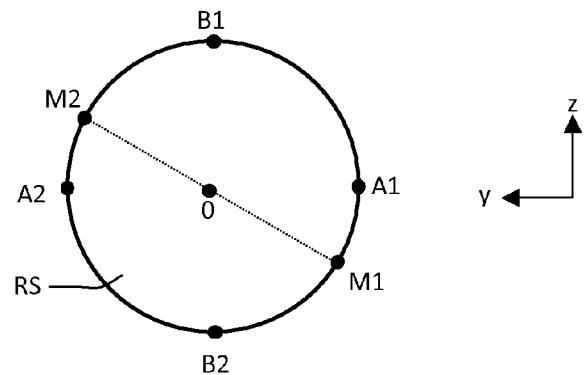
FIGS. 20 to 22 and 24 and 25 represent the propagation of the light rays in a spherical retroreflector implemented by the system according to the invention.
Figure 21:
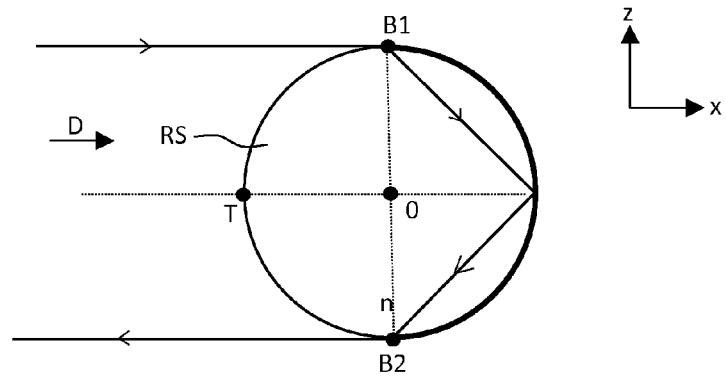
Figure 22:
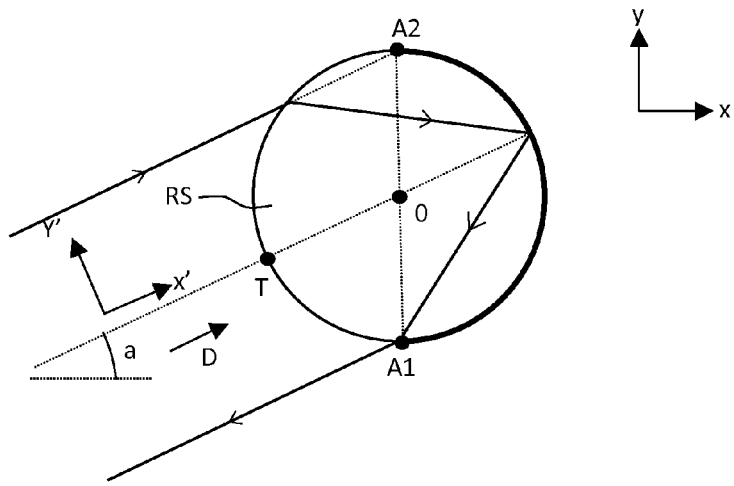

A three-rectangle reference frame Oxyz is defined that is associated with the transparent/reflecting spherical retroreflector RS of centre O and of radius R. It is indicated in FIGS. 20 to 22 which represent three cross sections of the sphere in the respective planes (y, z), (x, z) and (x, y). This reference frame is made up as follows:

axis Ox: normal to the virtual plane of separation between the transparent front hemisphere and the reflecting rear hemisphere. The axis Ox is horizontal in FIGS. 20 to 22;

axis Oy: axis contained in the plane of separation. The axis Oy is also horizontal in FIGS. 20 to 22;

axis Oz; axis contained in the plane of separation. The axis Oz is vertical in FIGS. 20 to 22.

The points A1, B1, A2, B2 represented in these figures are used to identify the orientation of the axes Oy and Oz of separation of the two hemispheres.

The presence of the reflecting coating on the rear hemisphere means that the input pupil and the output pupil of the reflector are identical and their contour is the central circle passing through the points A1, B1, A2 and B2.

If the source S is at infinity in the direction D, which is, for example, parallel to the horizontal plane xOy and pivoted by the angle a relative to the axis Ox, the point T is the intersection on the sphere of the radius of direction D from O.

In the horizontal plane xOy of FIG. 22, the portion of the beam of direction D which is reflected by the sphere is delimited on the sphere by:

the limit ray which passes through the transparent hemisphere, that is to say the one which passes through the point A1, one of the limit points of the transparent hemisphere;

the ray that is the symmetrical ray of the preceding one relative to O, that is to say the ray from the point A2, symmetrical to A1 and therefore diametrically opposite horizontally to A1.

In the vertical plane zOx of FIG. 21, the portion of the beam of direction D which is reflected by the sphere is delimited on the sphere by the two vertically diametrically opposite points B1 and B2.

Generally, as can be seen in FIG. 20, any ray of the incident cylindrical beam of direction D which passes through a point M1 of the circle of separation A1-B1-A2-B2 has, for reflected ray, a ray of the same direction D which passes through the diametrically opposite point M2. The contour of the reflected beam is therefore a cylinder of directrix D which is based obliquely on this circle of separation. The contour of the reflection produced on a plane of projection is:

either a circle of the same radius R as the sphere, when the plane of projection is parallel to the plane zOy of the circle of separation, or, in the general case, an ellipse of which the two characteristic parameters that are, for example, the direction of its great axis and its eccentricity, depend on the two parameters which define the orientation of the plane of projection.

Figure 23:
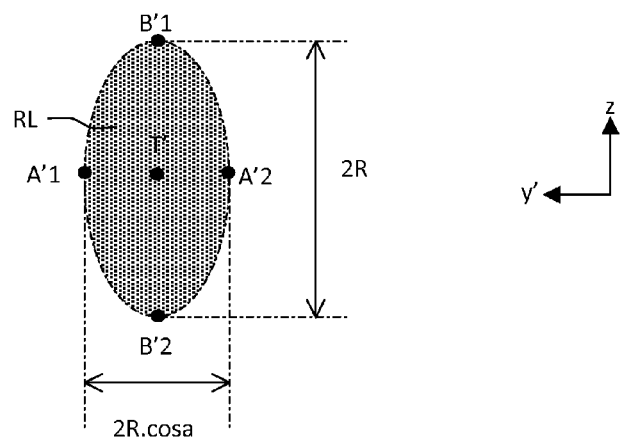
FIGS. 23 and 26 represent the images of different points obtained on the image sensor by retroreflection on the spherical retroreflector.

For example, for a vertical plane of projection, at right angles to D, and of horizontal axis y', the reflection RL of elliptical contour is represented in FIG. 23. The ends of the great axis of length 2R are the projections B'1 and B'2 of the points B1 and B2 of the reflector. The ends of the small axis of length 2R.cosα are the projections A'1 and A'2 of the points A1 and A2 of the reflector. The centre is the point T', projection of T.

The contour of the reflection is insufficient to determine on its own the six unknowns of position and orientation of the sphere. In effect, it provides only five parameters; the coordinates of its centre, the length of each of the two axes and the orientation of an axis.

Figure 24:
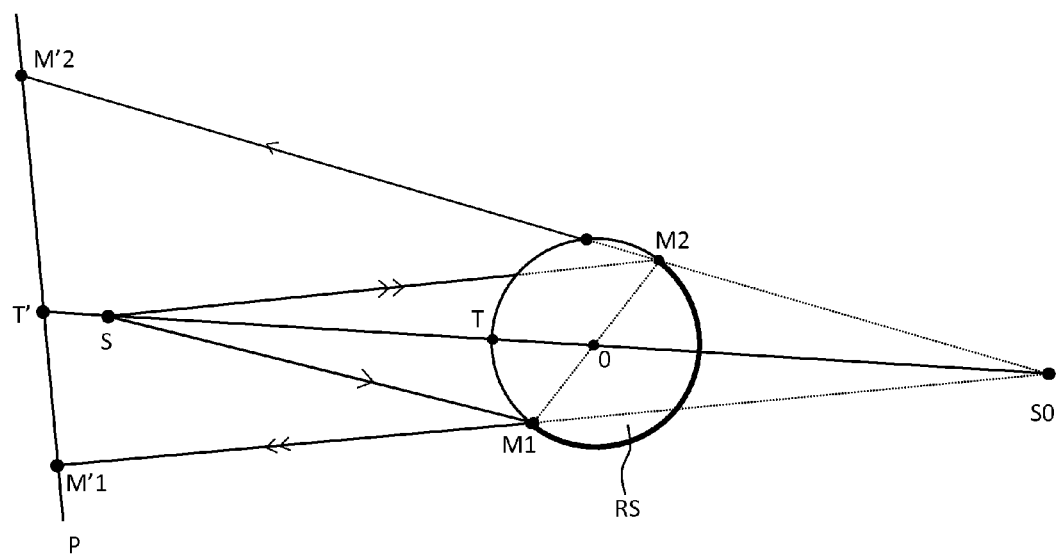

The case where the source is at finite distance is represented in FIG. 24. The latter represents a cross-sectional view of the reflector RS and of the plane P of projection, according to the plane which contains the points S, O and a point M1 belonging to the circle of separation of the two hemispheres, the images by the reflector of the radii borne by the directions S-M1 and S-M2 are respectively the radii borne by the directions S0-M2 and S0-M1.

The source S and its image S0 by the reflector are symmetrical relative to the centre O of the reflector. The reflected image of any point M1 of the circle of separation of the two hemispheres is the diametrically opposite point M2. The reflected image of the circle of separation of the two hemispheres lit by S is produced by S0 which lights this circle.

It is demonstrated that
whatever the position and the orientation of the reflector, this reflected image is produced by the projection of centre S0 on a fixed plane P close to S and bearing the image sensor,
the maximum dimension of the image is approximately two times that of the circular pupil of radius R that is formed by the circle of separation of the two hemispheres,
the point T' projected from S and from T is aligned with the projections M'1 and M'2 of the points M1 and M2.

The contour of the reflection RL is an ellipse whose form depends on the relative orientation of this plane P of projection relative to the plane of separation of the two hemispheres.

Figure 25:
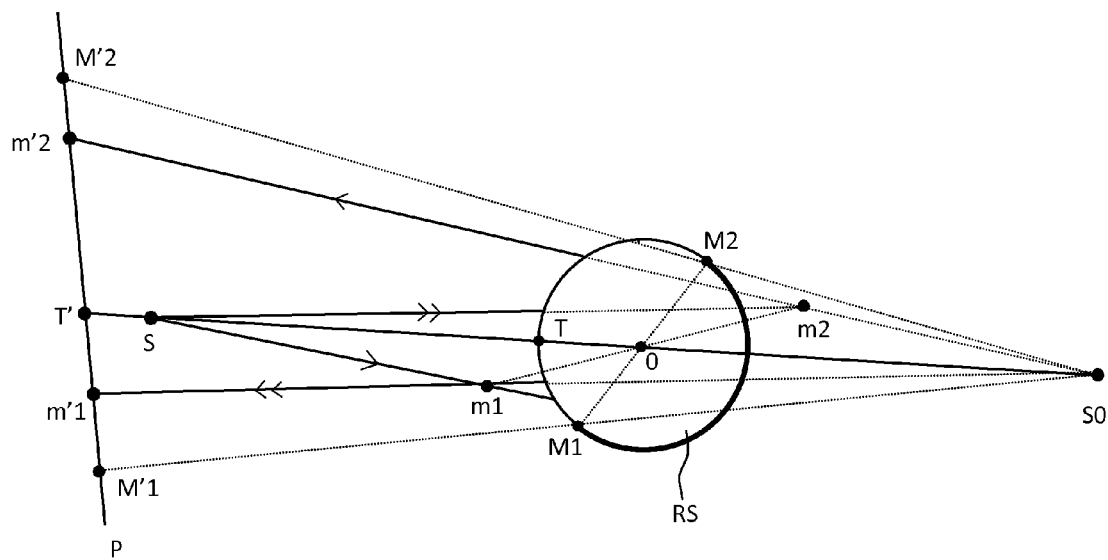

FIG. 25 represents, in the plane of cross section along the plane S-O-M1-M2, for any spot opaque element m1 inside the light angular sector M1-S-M2, the positions of the two projected shadows m'1 and m'2:
the shadow m'2 is generated by m1 before reflection on a ray directly deriving from S, one-arrow ray in FIG. 25,
the shadow m'1 is generated by m1 on a reflected ray which originates from the ray deriving directly from S, two-arrow ray in FIG. 25 in the direction Sm2, with m2 virtually symmetrical to m1.

Figure 26:
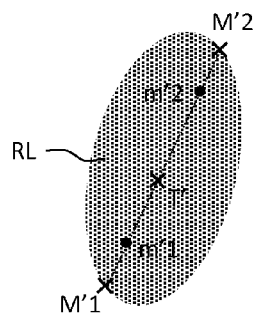

FIG. 26 represents the projected elliptical reflection RL and the two shadows m'1 and m'2 generated by m1 within the reflection.

Figure 27:
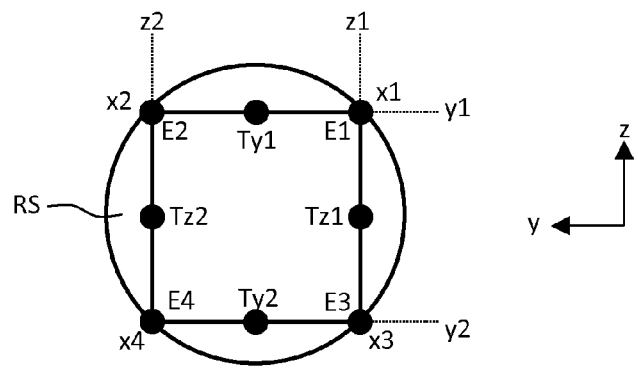
FIGS. 27 to 32 represent different views of a first meshing of a spherical retroreflector according to the invention.
Figure 28:
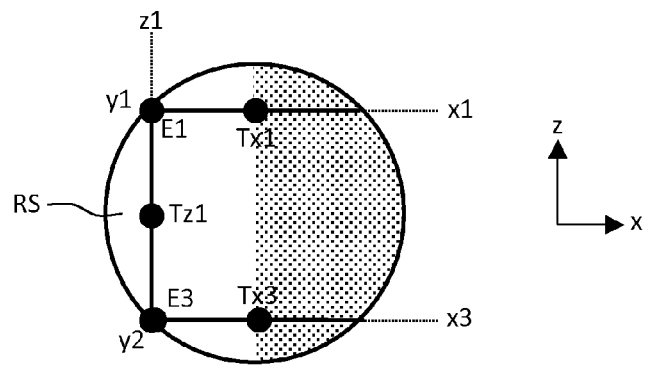
Figure 29:
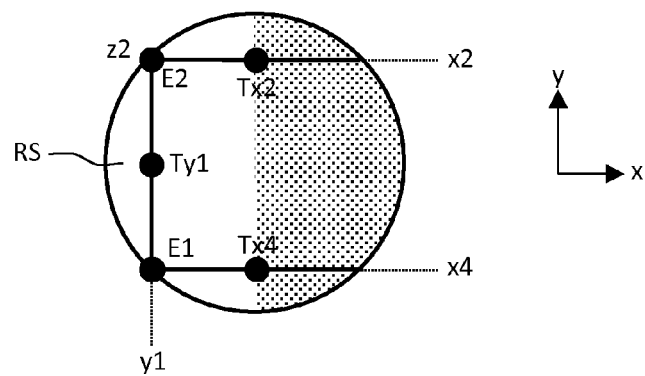
Figure 30:
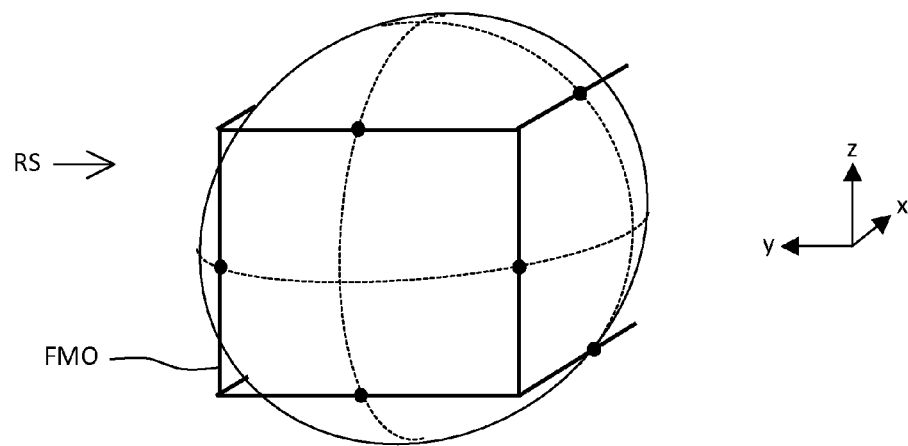

As has been seen, the contour of the reflection is insufficient to determine on its own the six unknowns of position and of orientation of the sphere. Also, a wire-meshing FMO is added around the sphere. In a first exemplary embodiment, the spherical reflector Re comprises a cage consisting of eight rectilinear rods FMO arranged along the edges of a cube centred on the sphere. This meshing is represented in FIGS. 27 to 30 which represent the meshing according to three different, planes at right angles to one another, FIG. 30 representing a perspective view of said meshing. It is defined as follows:
the sphere of radius R is tangential to each edge of the cube at the middle thereof;
the edges of the cube are parallel to the axes Ox, Oy and Oz of the spherical reflector;
in these conditions, the length of each edge is $R.2^{0.5}$;
the cage is made up of eight rods, concurrent in threes:
two front rods horizontal according to Oy, of axes y1 and y2, tangential to the sphere at their middles Ty1 and Ty2 as represented in FIG. 27;
two front rods vertical according to Oz, of axes z1 and z2, tangential to the sphere at their middles Tz1 and Tz2, as represented in FIG. 27;
four lateral rods horizontal according to Ox, of axes x1, x2, x3, x4, tangential to the sphere at Tx1, Tx2, Tx3, Tx4 on the circle of separation of the two hemispheres, as represented in FIGS. 28 and 29;

The four vertices of the cube in front of the transparent hemisphere are E1, E2, E3 and E4, individually points of conjunction of three rods at right angles to one another. FIG. 30 is an isometric perspective view, oblique projection to infinity on the vertical plane yOz. It represents:
the contour of the surface of the sphere assumed entirely opaque for greater clarity, and the rear reflecting treatment is not shown;
the three dotted lines of intersection between the surface of the sphere likened to the terrestrial globe and the planes of the trihedron Oxyz,
the "equatorial" plane on xOy, Oz is assumed to be the "polar" axis,
the "meridian" plane according to zOx,
the "meridian" plane according to zOy separating the two front and rear hemispheres,
the eight rods of the cage with,
the partial blanking by the sphere of two of the four horizontal lateral rods, namely x2 and x4;
the six visible points of the tangency of the rods with the sphere, out of the existing eight.

Figure 31:
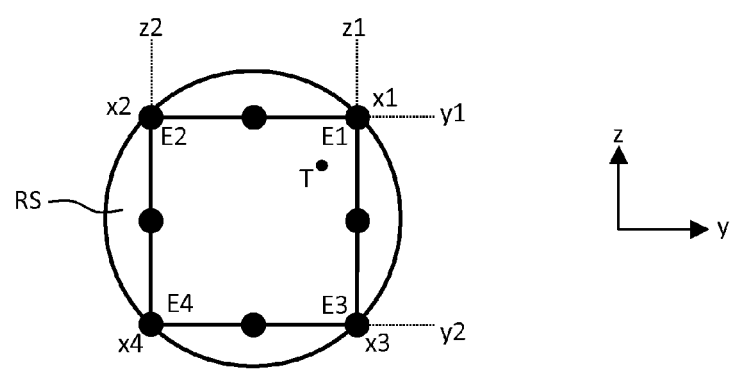
Figure 32:
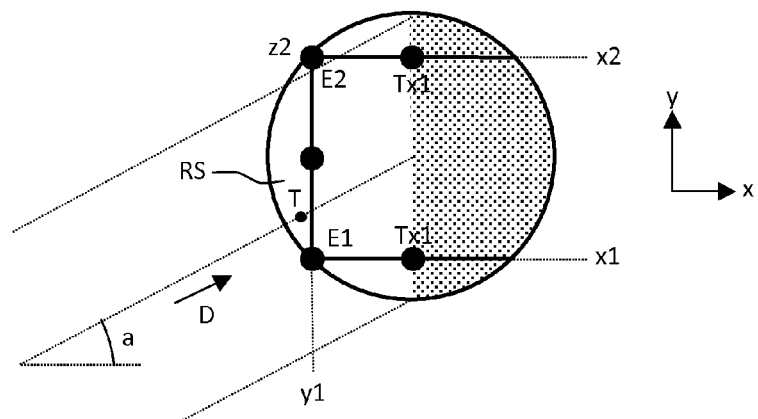

FIGS. 31 and 32 represent the impact of light rays from a source S situated at infinity on the reflecting sphere RS. These figures represent two views in the same planes as those of FIGS. 27 and 29. The point T gives the direction D of the straight line SO linking the source S and the centre O of the sphere. The direction D of this axis SO is pivoted by the angle α relative to the axis Ox. For this incidence, the axes z2 and y2 are no longer visible in reflection. Only fractions of each of the three axes concurrent at E1 are visible: x1, y1, z1.

Figure 33:
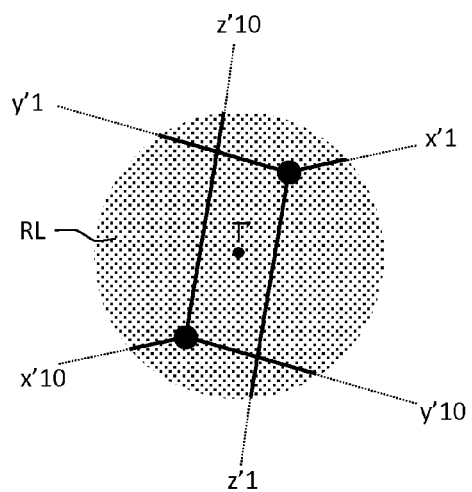
FIGS. 33 to 35 represent the different reflections obtained on the image sensor with the retroreflector of FIGS. 27 to 30.

FIG. 33 represents, for a source at infinity, the reflection RL with circular contour on the plane of the sensor, in the particular case where the latter is parallel to the plane zOy. The projected images of the axes and of the vertices are symmetrical relative to the projection T' of T.

By writing convention, in this figure, the two projected reflections of any real element M are respectively denoted M' and M'0. Thus, for example, the two projected reflections of the rod x1 are x'1 and x'10.

Figure 34:
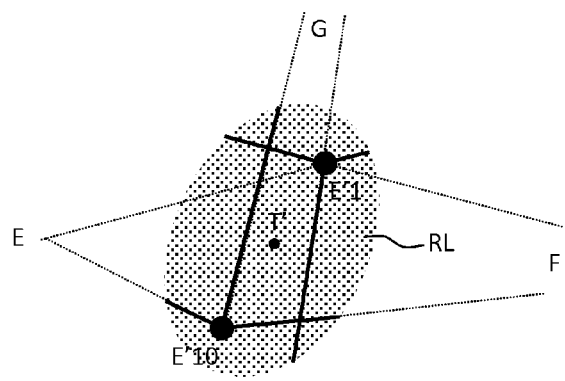

FIG. 34 represents the reflection RL with elliptical contour obtained in the case of a source at finite distance for any orientation of the sensor plane. The three rods of axes x1, y1, z1 concurrent at E1 and at right angles to one another produce, by projection, six black straight lines, concurrent in threes at E'1 and E'10. These six black straight lines provide three leak points E, F and G. This reflection provides thirteen parameters:
- the six parameters that are the coordinates of the three leak points,
- the two parameters that are the coordinates of the point T', intersection of the diagonals of the projected quadrilateral,
- the five parameters which characterize the elliptical contour of the reflection, that is to say, for example, the coordinates of its centre different from T', the lengths of the two axes and the orientation of the great axis.

The first eight parameters provide position and orientation of the reflector, as indicated previously:
- the centre of projection S0 sought is the common point of conjunction of the three spheres of respective diameters EF, EG, FG and of the straight line ST'. The centre O sought is the middle of the segment S-S0,
- the unknown orientations of the three rods concurrent at E1, namely x1, y1 and z1, are respectively those of the three straight line segments S0-E, S0-F and S0-G.

The last five parameters add redundancy to the constraint system.

Depending on the direction and the distance of the source relative to the reflector, a number of types of reflection are produced.

Figure 35:
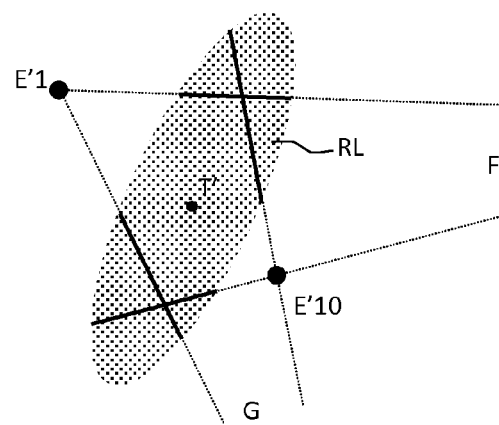

When the source is at the periphery of the angular field of the reflector, the reflection may not have any vertex, but only two pairs of two non-parallel straight lines as can be seen in FIG. 35. The centre S0 is then at the intersection of the sphere of diameter GF and of the straight line ST' with T', point of conjunction of the diagonals of the reconstituted projected quadrilateral;

When the source is at the periphery of the angular field of the reflector, the reflection may comprise no vertex, but only two non-parallel straight lines, thus generating only one leak point. This drawback can be circumvented by adding rods at the field edge, for example a contour of rods parallel to the plane yOz, in proximity to and in front of this plane;

When the source is at the centre of the angular field of the reflector, at least two vertices of the cage can be simultaneously reflected, thus generating, in the reflection, at least twelve straight lines concurrent at four points and six leak points.

For headset posture detection applications used notably in aeronautics, the reflecting hemisphere can be fully incorporated in the shell of a headset. The horizontal lateral rods x1 to x4 can be shortened to their points of tangency Tx1 to Tx4 or be only partially shortened and incorporated in the shell.

Other forms of cage with rectilinear rods can of course be used, they can notably consist of rods concurrent not in threes, but only in twos or can have no point of tangency with the sphere of the reflector.

Fourth Exemplary Embodiment: Spherical Reflector and Curvilinear Meshing

Figure 36:
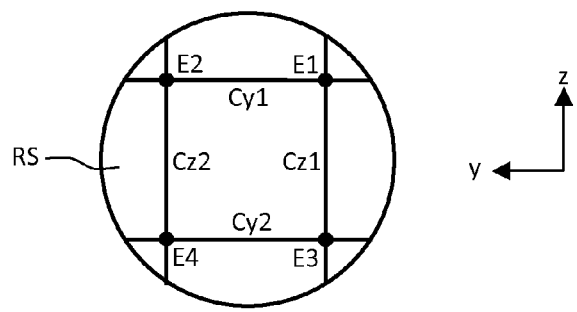
FIGS. 36 to 39 represent different views of a second meshing of a spherical retroreflector according to the invention.
Figure 37:
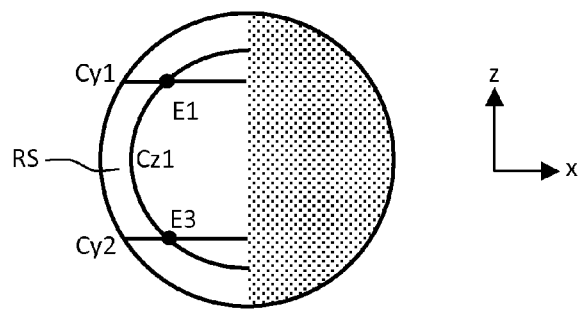
Figure 38:
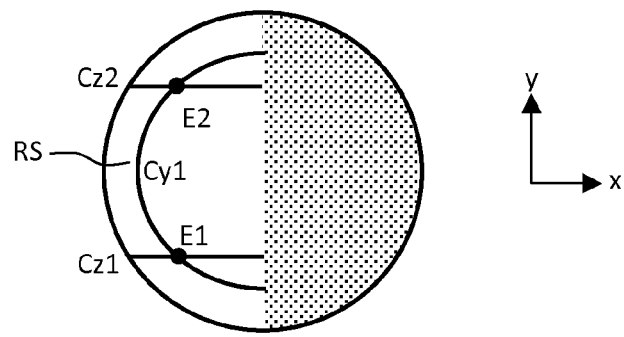

In a variant embodiment of the preceding retroreflector, the wire-meshing FMO is directly deposited on the reflecting sphere RS. More specifically, the surface of the sphere has deposited on it four half-circle wires or a thin opaque treatment, as represented in FIGS. 36, 37, 38 which represent three views of the sphere in respective planes (y, z), (x, z) and (x, y). The sphere therefore comprises:

- two wires Cz1 and Cz2 situated on two vertical planes parallel to zOx and symmetrical to one another relative to the centre O;
- two wires Cy1 and Cy2 situated on two horizontal planes parallel to yOx and symmetrical to one another relative to the centre O;

These four half-circles are secant in pairs at E1, E2, E3 and E4.

Figure 39:
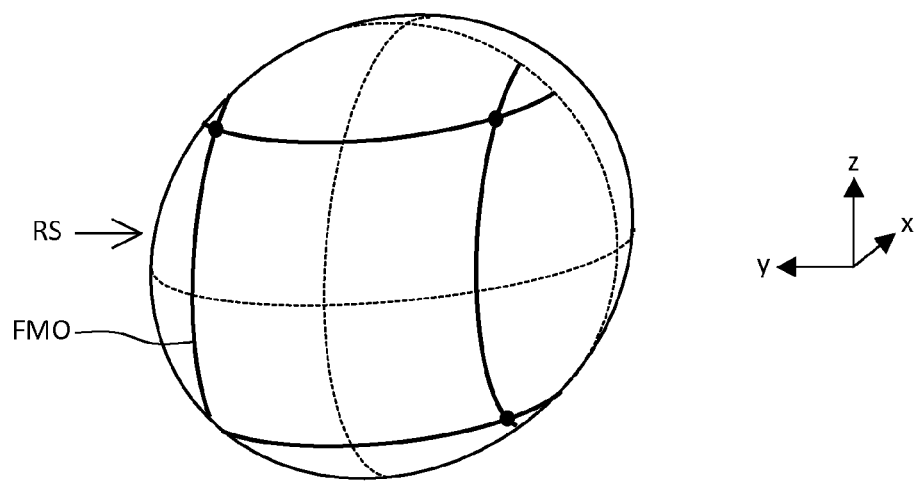

FIG. 39 is an isometric perspective view, that is to say an oblique projection to infinity on the vertical plane yOz. If represents:
- the contour of the surface of the sphere RS assumed entirely opaque for greater clarity. Furthermore, the rear reflecting treatment is not included,
- the three dotted lines of intersection of the surface of the sphere likened to the terrestrial globe with the planes of the trihedron Oxyz which are;
  - the "equatorial" plane according to xOy. Oz is assumed to be the "polar" axis,
  - the "meridian" plane according to zOx,
  - the "meridian" plane according to zOy, separating the two front and rear hemispheres,
- the four half-circle wires of the mesh FMO with,
  - the partial blanking by the sphere of two of the four wires, namely Cy2 and Cz2,
  - the three, out of the four visible points of intersections between the wires in pairs, namely the points E1, E2 and E3.

Figure 40:
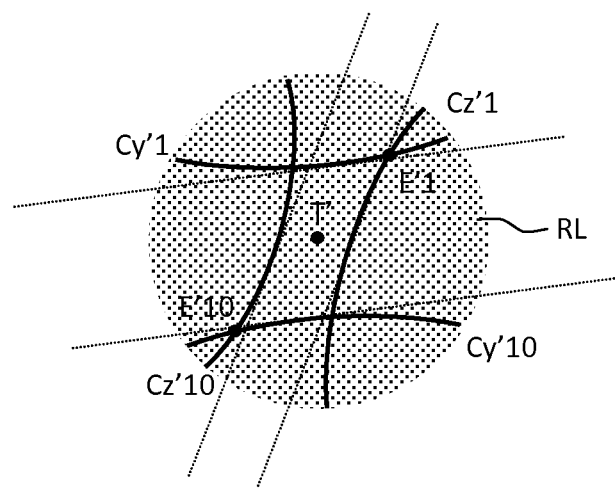
FIGS. 40 and 41 represent the different reflections obtained on the image sensor with the retroreflector of FIGS. 36 to 39.

FIG. 40 represents, for a source at infinity, the reflection RL with circular contour on the plane of the sensor, in the particular case where the latter is parallel to the plane zOy. The direction D of the straight line linking the centre O to the source S is given by a point T on the sphere assumed close to E1.

For this incidence, the half-circles Cz2 and Cy2 are no longer visible in reflection. Only the arcs of each of the two half-circles Cy1 and Cz1 and their intersection E1 are visible.

The projected images Cy'1, Cz'1, Cy'10, Cz'10 and E'1, E'10 of the arcs of circles Cy1 and Cz1 and of their intersection E1, are symmetrical relative to T', the projection of T and of O; the tangents at the points of intersection of the ellipses are parallel to one another.

Figure 41:
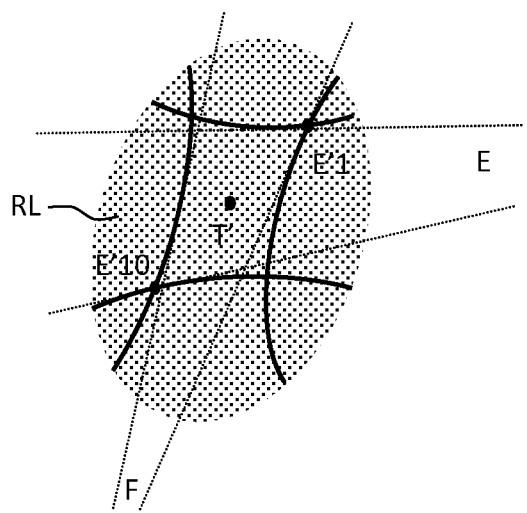

FIG. 41 represents the reflection RL with elliptical contour obtained in the general case, for any orientation of the sensor plane and for a source at finite distance.

The two half circle wires Cy1 and Cz1 concurrent at E1 and at right angles to one another, provide four black arcs of ellipses concurrent in pairs at E'1 and E'10. These four black arcs of ellipses provide two leak points E and F which are the intersections of the tangents to the ellipses at the points E'1 and E'10.

This reflection provides eleven parameters:
- the four parameters that are the coordinates of the 2 leak points E and F,
- the two parameters that are the coordinates of T', point of conjunction of the diagonals of the quadrilateral whose vertices are the points of conjunction of the black arcs of ellipses, such as the points E'10 and E'1,
- the five parameters which characterize the elliptical contour of the reflection, that is to say, for example, the coordinates of its centre, different from the point T', the lengths of the two axes and the orientation of the great axis.

The first six parameters provide position and orientation of the reflector, as indicated previously. The centre of projection S0 sought is at the intersection of the sphere of diameter EF and of the straight line ST'. The unknown orientations of the two tangents at E1 to the half-circular wires Cy1 and Cz1, which give the orientation of the reflector, are respectively those of the two straight line segments S0-E and S0-F.

The last five parameters add redundancy to the constraint system.

The parameters which characterize the four ellipses reconstructed from the four black arcs of ellipses also add redundancy to the constraint system.

Figure 42:
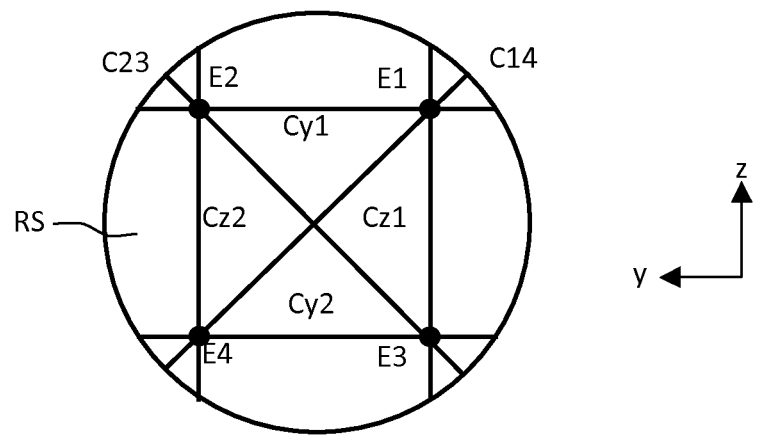
FIG. 42 represents a variant of the second meshing of a spherical retroreflector according to the invention.

To increase the accuracy on the preceding retroreflector, it is possible, for example, to add wires to the meshing on the sphere as indicated in FIG. 42 where two oblique half-circles C14 and C23 passing through the points E1 and E4 for C14 and through the points E2 and E3 for C23 have been added.

Figure 43:
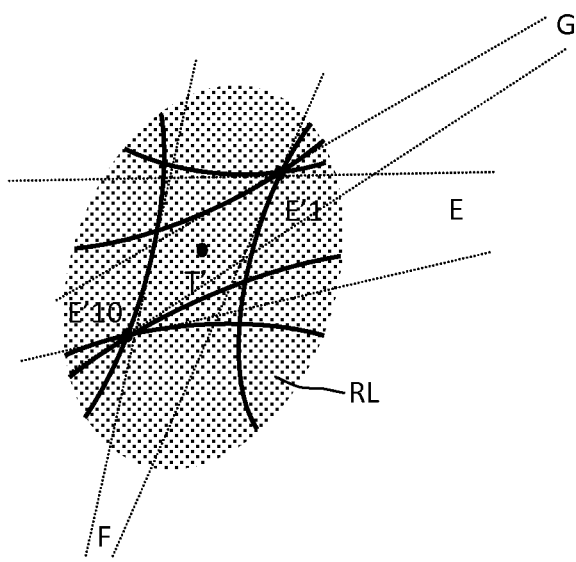
FIG. 43 represents the reflection obtained on the image sensor with the retroreflector of FIG. 42.

A third leak point is thus obtained in the reflection RL as can be seen in FIG. 43. This leak point corresponds to the intersection of the two tangents at E'1 and E'10 to the two new projected arcs of ellipses. This leak point corresponds to the direction of the tangent to the half-circle C14 at the point E1.

The six coordinates of the three leak points provide position and orientation of the reflector, by applying the properties detailed previously:

the centre of projection S0 is the point of conjunction common to the straight line ST and to the following three surfaces of revolution:
the sphere of diameter EF which is a particular torus for A=90°,
two toruses of axes EG and GF, centred on the middles of these segments,
the centre O sought is the middle of the segment S-S0,
the orientation of the reflector is given by the orientations of two of the three straight lines tangential at E1 to the three half-circular wires Cy1, Cz1 and C14, these orientations are those of the three straight line segments S0-E, S0-F and S0-G.

The main advantages of the system for detecting the posture of a moving object according to the invention are:
the simplicity of the fixed detection device. The device according to the invention comprises only a single image sensor, it can operate without fixed screen and without resist in a return mirror. The retroreflector includes no specific marking;
the simplicity of the device arranged on the moving object which comprises only a retroreflector of simple form;
the ease of detection which consists in detecting filiform shadows in a reflection given by the retroreflector;
the measurement accuracy;
the absence of static by the solar lighting in as much as the system operates by retroreflection;
the tolerance to measurement defects obtained by virtue of the redundancy of the wire-meshing arranged on the retroreflector;
obtaining a wide field of measurement obtained with a single retroreflector, in particular in the devices that implement a spherical retroreflector in which the field reaches $2\pi$ steradians.

What is claimed is:

1. A system for detecting a posture of a moving object in space comprising:
a fixed electro-optical device of known orientation comprising at least one emission source, an image sensor and a processing system that performs image analysis; and
an optical assembly comprising at least one optical retroreflector arranged on the moving object, wherein:
the optical retroreflector is an optical sphere of variable index comprising a transparent hemisphere and a reflecting hemisphere such that a light ray, refracted by the transparent hemisphere, reflected by the reflecting hemisphere and refracted a second time by the transparent hemisphere re-emerges parallel to its direction of incidence,
the optical retroreflector comprises a meshing comprising at least three opaque wires, of a thickness and known geometrical arrangement,
an image of the optical retroreflector lit by the source forms a reflection on the image sensor, said reflection comprising at least two images of a shadow of one of the at least three opaque wires by the optical retroreflector, and
the processing system performs the image analysis to detect at least an orientation of a leak line given by said images, said orientation being representative of a first parameter of the posture of the moving object.

2. The system for detecting the posture of a moving object according to claim 1, wherein the processing system analysis detects a form of the reflection, said form being representative of at least one second parameter of the posture of the moving object.

3. The system for detecting the posture of a moving object according to claim 1, wherein the meshing comprises eight straight wires of equal length, four first wires forming a square and four second wires being parallel to one another, at right angles to a plane of the square, one of the ends of the four second wires being merged with one of the ends of the four first wires.

4. The system for detecting the posture of a moving object according to claim 1, wherein the meshing comprises four semi-circular wires of identical form, two first wires being arranged in two first planes symmetrically parallel relative to a center of the optical sphere, two second wires being arranged in two second planes symmetrically parallel relative to the center of the sphere, the two second planes being at right angles to two first planes.

5. The system for detecting the posture of a moving object according to claim 4, wherein the meshing comprises third semi-circular wires of identical form obliquely intersecting the first wires and/or the second wires.

6. The system for detecting the posture of a moving object according to claim 1, wherein a contour of the reflection is an inclined ellipse, an inclination of the ellipse, and lengths of great and small axes being representative of parameters of the posture of the moving object.

7. A pilot headset, comprising:
at least one optical retroreflector to operate in a system for detecting a posture of a moving object, wherein the system comprises a fixed electro-optical device of known orientation comprising at least one emission source, an image sensor and a processing system that performs image analysis, and wherein:
the at least one optical retroreflector is an optical sphere of variable index comprising a transparent hemisphere and a reflecting hemisphere such that a light ray, refracted by the transparent hemisphere, reflected by the reflecting hemisphere and refracted a second time by the transparent hemisphere re-emerges parallel to its direction of incidence,
the optical retroreflector comprises a meshing comprising at least three opaque wires, of a thickness and known geometrical arrangement,
an image of the optical retroreflector lit by the source forms a reflection on the image sensor, said reflection comprising at least two images of a shadow of one of the at least three opaque wires by the optical retroreflector, and the processing system performs the image analysis to detect at least an orientation of a leak line given by said images, said orientation being representative of a first parameter of the posture of the moving object.

* * * * *